US006612188B2

(12) United States Patent
Hamilton

(10) Patent No.: US 6,612,188 B2
(45) Date of Patent: Sep. 2, 2003

(54) SELF-POWERED FLUID METER

(75) Inventor: David Hamilton, Auburn, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 84 days.

(21) Appl. No.: 09/754,025

(22) Filed: Jan. 3, 2001

(65) Prior Publication Data
US 2002/0083778 A1 Jul. 4, 2002

(51) Int. Cl.[7] ................................................ G01F 15/06
(52) U.S. Cl. ................................................... 73/861.78
(58) Field of Search .......................... 73/861.78, 270, 73/271, 258, 861.79, 861.87, 861.86, 861.77, 861.88, 114, 119; 137/486, 487.5; 324/34; 364/465; 340/870.02

(56) References Cited

U.S. PATENT DOCUMENTS

| | | | |
|---|---|---|---|
| 3,685,353 A | | 8/1972 | Gestler |
| 3,820,090 A | | 6/1974 | Wiegand |
| 3,824,456 A | * | 7/1974 | Wiegand ..................... 324/34 |
| 4,073,186 A | * | 2/1978 | Erwin, Jr. .................... 73/114 |
| 4,132,981 A | | 1/1979 | White |
| 4,313,168 A | * | 1/1982 | Stephens et al. ............ 364/465 |
| 4,315,523 A | * | 2/1982 | Mahawili et al. ........... 137/486 |
| 4,579,008 A | | 4/1986 | Bohm et al. |
| 4,848,164 A | * | 7/1989 | Quarve et al. ............ 73/861.77 |
| 5,177,370 A | * | 1/1993 | Meister ...................... 307/10.1 |
| 5,187,989 A | | 2/1993 | Butteau |
| 5,261,275 A | * | 11/1993 | Davis .......................... 73/258 |
| 5,530,298 A | | 6/1996 | Gerhold |
| 5,540,107 A | * | 7/1996 | Silverman et al. ........ 73/861.78 |
| 5,604,881 A | * | 2/1997 | Thomas ...................... 711/104 |
| 5,632,169 A | | 5/1997 | Clark et al. |
| 5,659,300 A | * | 8/1997 | Dresselhuys et al. .. 340/870.02 |
| 5,663,641 A | * | 9/1997 | Morita ........................ 324/174 |
| 5,682,287 A | * | 10/1997 | Pollman et al. ............ 361/93.2 |
| 5,690,893 A | * | 11/1997 | Ozawa et al. ................ 422/67 |
| 5,898,241 A | | 4/1999 | Ganderillas |
| 5,908,103 A | | 6/1999 | Dlugos |
| 6,012,339 A | * | 1/2000 | Genack et al. ........... 73/861.77 |
| 6,191,687 B1 | | 2/2001 | Dlugos et al. |

FOREIGN PATENT DOCUMENTS

| | | |
|---|---|---|
| WO | 9930288 | 6/1999 |
| WO | 9939301 | 8/1999 |
| WO | 9954685 | 10/1999 |
| WO | 0017997 | 3/2000 |
| WO | 0033028 | 6/2000 |

OTHER PUBLICATIONS

Frederic Puybaret, Denis Vernizeau; Effet Wiegand; P. 2, P. 3, p. 4, P. 11, P. 12, P. 13, P. 14, P. 15, P. 22, P. 24; Dated 5 Janvier 1993.
D. Lautru, LF Statique—Rapport sur l'effet Wiegand; P. 2, P. 3, P. 6, P. 7, P. 15; Dated Aug. 28, 1995.
D. Lautru, LF Statique—Rapport sur les essais Wiegand; P. 1, P. 3, P. 6; Dated Sep. 15, 1995.
Fisher–Rosemont ™, Model 0355 UMB Power Pulser, Installation and Operation.
Richard R. Gerhold—Generateur d'Impulsions a l'etat solide; 2709 620; 94 10552.
Vacuumschmelze GmbH—Pulse Wire Sensors; Feb. 1992 Tan 580/12.
Hersey Products, model SER–1; Dated Jan. 1996.
Vacuumschmelze; Datenblatt—Specification; Aug. 12, 1993.
Wiegand Effect Sensors, Joseph Pasqualucci, Sensors Jan. 1991.

* cited by examiner

*Primary Examiner*—Hezron Williams
*Assistant Examiner*—Jewel V. Thompson
(74) *Attorney, Agent, or Firm*—Bradley Arant Rose & White LLP

(57) ABSTRACT

The present invention provides for a self-powered fluid meter that uses the kinetic energy of a fluid being measured to provide power for circuitry that may perform functions related to the fluid measurement. An element is placed within a rotating magnetic field created from the kinetic energy of a fluid. This element creates an electrical pulse to power the circuitry.

10 Claims, 6 Drawing Sheets

SELF-POWERED FLUID METER

FIELD OF THE INVENTION

The present invention relates to a self-powered fluid meter. More specifically, the present invention provides a method and device for generating electrical pulses from the kinetic energy of a moving fluid. These pulses may then be used to provide data for fluid measurement and to power components associated with such measurement. By way of example, the pulses may power circuitry or other electronics that perform various fluid measurements based on information provided by the pulses.

BACKGROUND OF THE INVENTION

Conventional devices for fluid flow measurement are known. Measurements of the rate or volume of fluid flow may be desirable or even mandatory for operations involving the transport, manufacture, or storage of various fluids. While various devices and techniques for fluid measurement have been applied, many utilize a measuring element placed in the path of fluid flow. The measuring element is generally configured such that the kinetic energy of the moving fluid is translated so as to cause the measuring element to move in a way that is measurable. For example, the measuring element may be configured to rotate upon being placed into the path of a moving fluid. Various mechanisms may then be provided for detecting the rotational speed of the measuring element and, in some cases, to determine the total number of revolutions. Knowing the relationship between a revolution of measuring element and the corresponding volume of fluid that is displaced or passed through the meter, the volume and/or rate of fluid flow may be calculated or determined.

Where conventional electronics or other circuitry are provided for performing various functions related to the fluid measurement, power must be provided to operate the same. In some applications, an independent power source may be readily available for supply to the fluid meter. However, in other applications, an independent power source may be unavailable, impractical, or less economical to supply. Batteries offer only a limited solution due to their typical limitations such as battery life, costs, and reliability in harsh environments. Thus, a fluid meter capable of performing fluid measurements while also providing the power necessary for those measurements is desirable.

SUMMARY OF THE INVENTION

The present invention provides a method and device for fluid measurement that is self-powered. More specifically, the present invention provides for generating electrical pulses from the kinetic energy of a moving fluid while measuring such fluid. The pulses provide data for fluid measurements and power for components associated with taking, storing, or reporting of such measurements.

The present invention provides numerous embodiments for a self-powered fluid meter. A summary of exemplary embodiments will now be provided. However, using the teachings disclosed herein, other examples will be apparent to those of ordinary skill in the art and such are within the spirit and scope of the present invention.

In one exemplary embodiment, the present invention provides for a self-powered fluid meter by creating a rotating magnetic field from the kinetic energy of a fluid moving through the fluid meter. Electrical pulses are then created using a magnetic flux sensor positioned within the influence of the rotating magnetic field. These electrical pulses are then used to power a circuit.

Numerous examples exist for creating a rotating magnetic field from the kinetic energy of a moving fluid. By way of example only, a turbine or nutating disk may be placed into the path of a moving fluid so as to translate the kinetic energy of the moving fluid into a rotating shaft. Such rotating shaft may be connected to a magnet or configured so as to cause a magnet to rotate. Alternatively, numerous magnets may be configured so as to present alternating fields of magnetic flux when caused to rotate through connection with the shaft.

A magnetic flux sensor is then positioned within the influence of the magnetic field created by the magnet or magnets. As this field rotates, the magnetic flux sensor is subjected to alternating flux polarity. In response, the magnetic flux sensor creates electrical pulses. Any sensor capable of creating an electrical pulse upon being subjected to a magnetic field of changing flux polarity may be used. By way of example only, one such type of sensor that may be used to create electrical pulses upon being subjected to changes in magnetic flux polarity is disclosed in U.S. Pat. No. 3,820,090, issued to Wiegand, which is incorporated in its entirety herein by reference. This reference discloses a magnetic sensor that may be formed by cold working a wire constructed from iron, cobalt, and vanadium. When placed in the presence of a changing magnetic field, the wire will produce an electrical pulse that may be detected and harnessed by appropriate circuitry. Alternatively, when placed in the presence of a changing magnetic field, the wire will also induce a voltage across a coil located near the wire. This resulting electrical pulse may also be detected or harnessed by appropriate circuitry.

The electrical pulses generated by the magnetic flux sensor may be used to power a circuit performing functions related to fluid measurement. By way of example only, such a circuit may include a counter or totalizer that determines the volume of fluid or rate of fluid moving through the fluid meter by counting the number of electrical pulses. The circuit may also include a memory function, powered by the pulses, for storing information related to the fluid measurement such as the total volume or rate of fluid flow. The information may be stored in the form of code to maximize data retention and endurance. The use of a memory circuit may be advantageous for applications where retrieval of measurement data may be intermittent. Consider, for example, residential water meters that are checked on a periodic basis for billing of customers.

By way of further example, the electrical pulses may also power a circuit that performs a function of transmitting information related to the fluid measurement. More specifically, the circuit may be configured for determining the volume and/or rate of fluid flow, storing that information, and then transmitting that information at a later time. In the example of residential water meters, the water meter may be configured with circuitry that is powered by the electrical pulses, that determines the total volume of water consumed during a particular period, stores such information, and then transmits that information by radio signals on a periodic basis for billing purposes. Numerous other circuits and applications will be apparent to one of ordinary skill in the art using the teachings disclosed herein.

In another exemplary embodiment of the present invention, a self-powered device for measuring fluid flow includes a meter housing that defines a fluid inlet and a fluid outlet. A meter magnet is configured within the meter housing such that fluid flowing into the meter housing through the fluid inlet and exiting through the fluid outlet causes the meter magnet to rotate. The meter magnet may be of various configurations. For example, the meter magnet may be disk shaped with dual or multiple poles. By way of further example, the meter magnet may actually consist of multiple magnets configured within the housing so as to be rotatable.

A register housing is provided that is attached to the meter housing. A register magnet is located within the register housing and is configured to be in magnetic communication with the meter magnet. This configuration is structured so that as the meter magnet is caused to rotate, the register magnet also rotates. As with the meter magnet, the register magnet may consist of a single magnet with dual or multiple poles. Alternatively, the register magnet may include a number of magnets configured so as to create fields of alternating magnetic flux polarity upon rotation.

A generating element is positioned within the field of magnetic flux created by the register magnet. This generating element is configured for creating electrical pulses upon being subjected to the fields of changing magnetic flux created by the rotation of the register magnet. Any generating element capable of creating electrical pulses upon being subjected to fields of changing magnetic flux may be used. By way of example, a Wiegand wire may be used as discussed above.

The register housing may be configured with various circuits for performing functions related to fluid measurement as discussed above. The electrical pulses provided by the generating element are used to both power this circuitry as well as provide information related to the fluid measurement. By providing for a register housing that is detachable, the functions performed by the circuitry configured within the register housing may be modified or customized by simply substituting a new register housing with the desired circuitry.

In another exemplary embodiment of the present invention, a device for fluid measurement is provided that includes a chamber configured with an inlet and an outlet for fluid flow. At least one magnet is located in the chamber. The magnet may be disk or cylindrically shaped and include dual or multiple poles so as to provide fields of alternating magnetic flux polarity upon the rotation of the magnet. Alternatively, several magnets may be configured within the chamber and oriented so as to provide fields of changing magnetic flux polarity upon rotation. For example, two or more magnets may be positioned on a disk or other wheel at equally spaced intervals. The orientation of the magnets, with respect to north and south, are then alternated so as to provide a field of alternating magnetic flux polarity during rotation.

A measuring element is also located within the chamber. The measuring element is in mechanical communication with the magnet and is so configured such that a fluid flowing into the chamber through the fluid inlet acts upon the measuring element so as to cause the magnet or magnets to rotate. By way of example, the measuring element may be connected to the magnet by a shaft.

Within the field of alternating magnetic flux polarity created by the rotation of the magnet or magnets discussed above, a generating element is positioned. The generating element is configured so as to create electric pulses upon being subjected to the changing field of magnetic flux created by the rotation of the magnet or magnets. By way of example only, a Wiegand wire, as discussed above, may be used as an operating element.

The electrical pulses created by the generating element may be used to provide both information related to fluid measurement and power for circuitry performing functions necessary to such fluid measurement. By way of example, circuitry may be provided for determining the amount of fluid flowing through the meter, storing such information, and/or transmitting such information.

In still another exemplary embodiment of the present invention, a self-powered fluid measuring device may include a chamber with at least one magnet located within said chamber. As discussed above, the magnet may be constructed from a variety of shapes with single or multiple poles. Furthermore, multiple magnets may be utilized to create a field of alternating magnet flux polarity. A measuring element is configured in mechanical communication with the magnet. The measuring element is configured such that upon being placed into the path of a flowing fluid the measuring element causes the magnet to rotate within the chamber.

For this embodiment of the present invention, the measuring element is not required to be located within the chamber that contains the magnet. This embodiment may be useful, for example, where the measuring element is inserted into a pipe or other conduit for the fluid being measured. The measuring element may take on a variety of shapes and structures for converting the kinetic energy of the flowing fluid into the rotations of the magnet. For example, the measuring element may consist of a turbine, nutating disk, or rotor connected to the magnet by a rotatable shaft.

A generating element is positioned within the influence of the magnetic flux of the rotating magnet or magnets. Upon being subjected to fields of alternating flux polarity, the generating element creates a series of electrical pulses. As with the other embodiments described above, these pulses may be used to carry both information and provide power for circuitry related to the fluid measurement.

These and other features, aspects, and advantages of the present invention will become better understood with reference to the following description and independent claims. The accompanying drawings, which are incorporated herein and constitute a part of this specification, illustrate an embodiment of the present invention and together with the description, serve to explain the principals and objectives of the invention.

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in or may be determined from the following detailed description. It is to be understood by one of ordinary skill in the art that the present discussion is a description of exemplary embodiments only, and is not intended as limiting the broader aspects of the present invention.

The present invention provides for a self-powered fluid meter. More specifically, the present invention provides for a fluid meter that uses the kinetic energy of the fluid being measured to provide power for circuitry that may perform functions related to the fluid measurement. A generating element is used that creates electrical pulses upon being subjected to fields of changing magnetic flux polarity. These electrical pulses simultaneously provide information related to fluid measurement while providing power for circuitry or other electronics that perform functions related to the fluid measurement.

Figure 1:
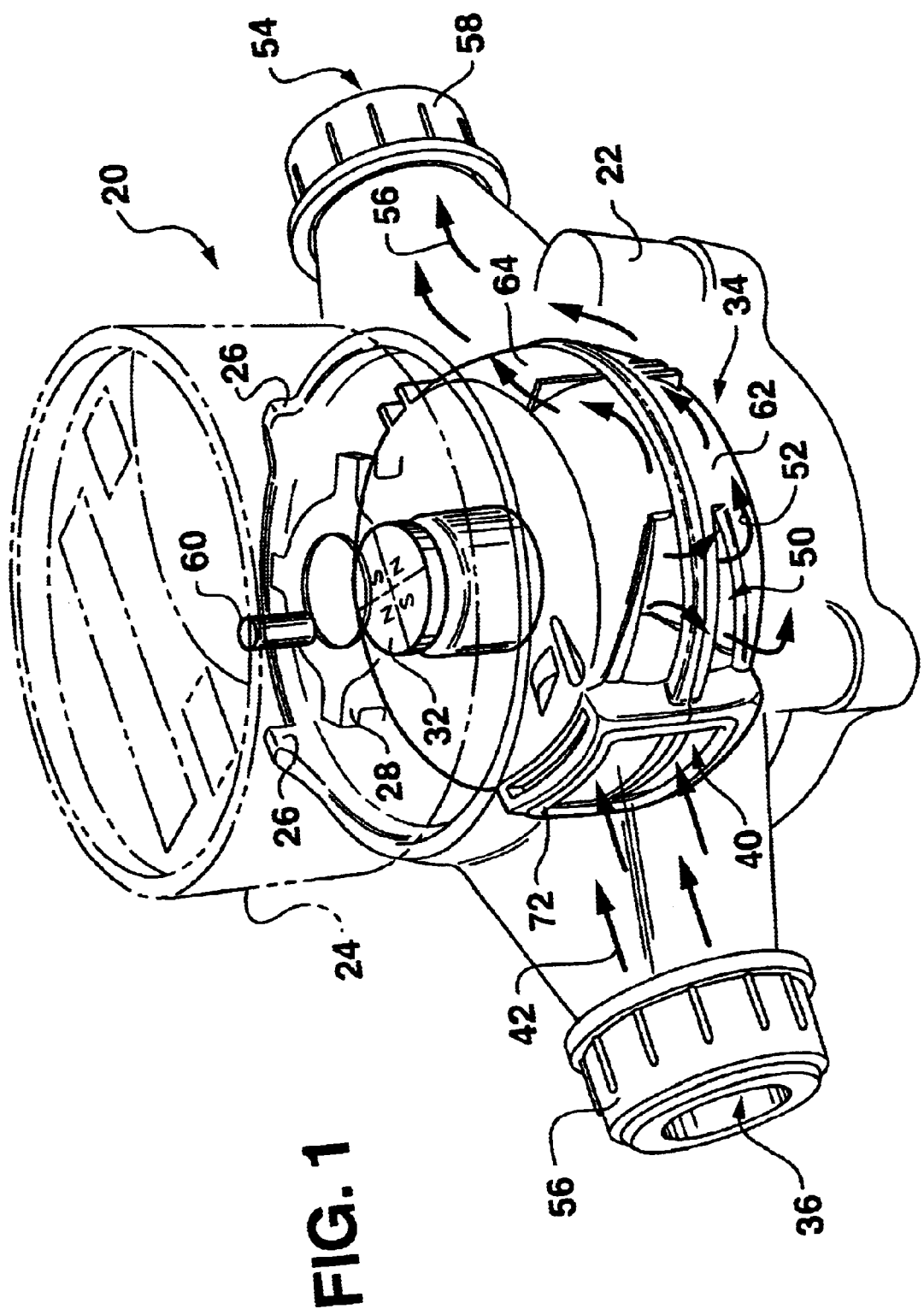
FIG. 1 is a perspective and partial cross-sectional view of an exemplary embodiment of the invention configured within an exemplary fluid meter.
Figure 2A:
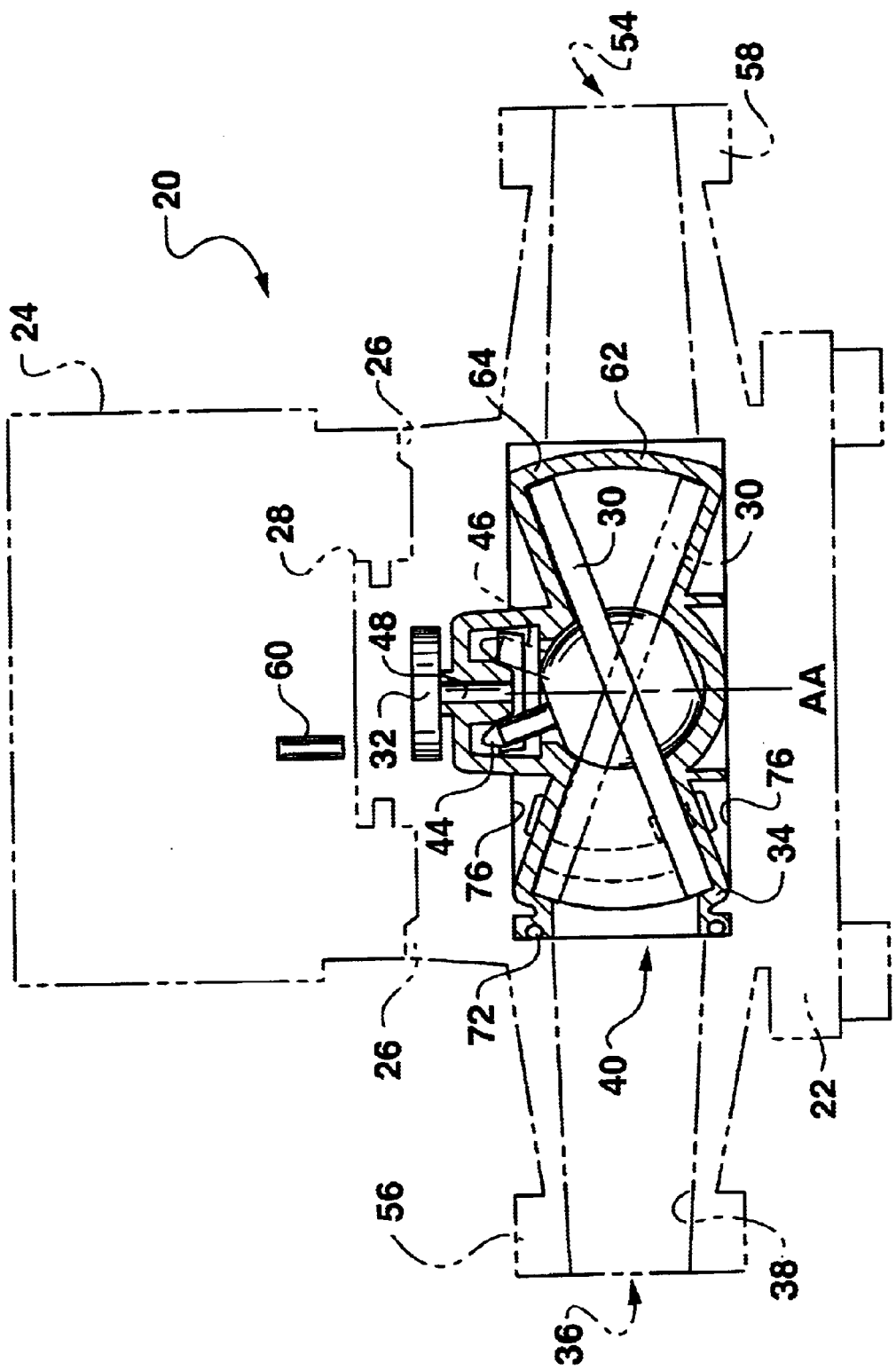
FIG. 2 is a cross-sectional view of the embodiment depicted in FIG. 1.
FIG. 2B is an alternate embodiment of the present invention.

FIG. 1 and FIG. 2 depict a fluid meter 20 representing an exemplary embodiment of the present invention. Fluid meter 20 includes a meter housing 22 detachably connected to a register housing 24. A plurality of tabs 26 and a locking boss 28 are used to detachably secure the meter housing 22 to the register housing 24. Detachability allows for the register housing 24 to be readily substituted during the life of the fluid meter 20 and thereby facilitates replacement or changes in features. For example, the register housing 24 may provide a housing or interior for including a register to provide mechanical recording and display of fluid measurements. Alternatively, the register housing 24 may be substituted so as to include a register having solid state electronics or other circuitry for recording and reporting fluid measurements as will be discussed below. Detachability is not required by the present invention; the meter housing 22 and register housing 24 may also be permanently connected.

The meter housing 22 provides a housing or interior for a measuring element 30 that converts the kinetic energy of a moving fluid into a rotation or other movement. By nutating about axis AA, the measuring element 30 translates the kinetic energy of a fluid flowing through the meter housing 22 into the rotation of a meter magnet 32, as will be more fully described below. However, the present invention is not limited to the particular measuring element 30 depicted in FIG. 1 and FIG. 2, and may include any mechanism that can translate the kinetic energy of a flowing fluid into a measurable movement. By way of example only, the measuring element 30 may also be constructed from a rotatable member, such as a turbine, rotor, disk, or other such mechanisms. For the embodiment shown in FIG. 1 and FIG. 2, the measuring element 30 is encased within a cartridge 34, the details of which will be described more fully below.

In operation, fluid enters meter housing 22 through a fluid inlet or ingress 36. Fluid then travels along a conduit 38 and enters the cartridge 34 through a cartridge inlet 40 as indicated by the flow arrows 42. Within the cartridge 34, the fluid acts upon the measuring element 30. The measuring element 30 then converts the kinetic energy of the moving fluid by nutating, or oscillating, about axis AA. A shaft 44, connected to measuring element 30, then acts upon a spindle 46 so as to cause the meter magnet 32 to rotate about axis AA on a magnet shaft 48. Flow then exits cartridge 34 through a cartridge outlet 50 as indicated by flow arrows 52. Fluid then exits meter housing 22 through a fluid outlet or egress 54 as shown by flow arrows 56.

The fluid meter 20 may be connected into the path of fluid flow at fluid inlet 36 and fluid outlet 54. This connection may be permanent or resealable. Any suitable resealable connections known in the art may be used. For example, the embodiment show in FIG. 1 uses resealable, threaded connectors 57 and 58. The meter housing 22, measuring element 30, and cartridge 34 may be constructed from any number of materials suitable for contact with the fluid to be measured. By way of example only, these materials may include bronze, plastics, iron, copper, and various other materials.

A generating element 60 is configured within the register housing 24 such that it is subjected to the changing fields of magnetic flux created by rotations of the meter magnet 32. The generating element 60 is constructed so as to produce electrical pulses in response to encountering the field of alternating magnetic flux created by meter magnet 32. Any generating element 60 capable of creating electrical pulses in response to changes in the field of magnetic flux may be utilized. One such particular element that may be applied is referred to generally as a "Wiegand" wire. As described more fully in U.S. Pat. No. 3,820,090, issued to Wiegand, this magnetic sensor is constructed from a bistable ferromagnetic wire having a core portion and a shell portion. The shell surrounding the core has a relatively high coercivity; while the core of the Wiegand wire has a relatively low coercivity. As set forth in U.S. Pat. No. 3,820,090, which is incorporated herein by reference, the wire may be constructed from an alloy having 48% iron and 52% nickel. Through processing, the Weigard wire is formed to have a core and shell as described.

When removed from the presence of an external field, the higher coercivity shell acts upon the core of the Wiegand wire to cause a magnetizing of the core in a direction opposite to the magnetization of the shell. Upon placing the Wiegand wire into an external field, this effect may be overcome so as to cause the magnetizing of the core to switch. A coil, referred to as a "pick-up coil", placed appropriately near the Wiegand wire will detect the reversal of magnetization in the Wiegand wire because an electrical pulse will be simultaneously generated. Alternatively, an electrical pulse will also be created by the Wiegand wire and this electrical pulse can also be detected and used by appropriate circuitry. For simplicity, the embodiment depicted in FIG. 1 simply shows the generating element 60 without the pick-up coil or associated circuitry for receiving the electrical pulse generated in the Wiegand wire or pick-up coil.

Accordingly, as shown in FIG. 1, a fluid acting upon the measuring element 30 in cartridge 34 causes the meter magnet 32 to rotate about axis AA. As meter magnet 32 rotates, the generating element 60 is subjected to a field of changing magnetic flux. By way of example only, the meter magnet 32 shown in FIG. 1 is divided into four quadrants of polarity. A complete revolution of meter magnet 32 thereby creates four changes in magnetic flux that are detected by generating element 60. Where generating element 60 is a Wiegand wire, four electrical pulses may be created by the Wiegand wire in response to the four changes in magnetic flux polarity. By predetermining the volume of fluid that passes through the meter during one revolution of the meter magnet 32, the rate of fluid flow or amount of fluid flow may be calculated from the number of electrical pulses created by the generating element 60. A register located within the register housing 24 may be provided with appropriate circuitry to perform such functions and to display, store, or transmit the results. Furthermore, the same electrical pulses provided to the circuitry used to perform such functions can also be used to power the circuitry.

For example, the output of a typical Wiegand wire assembly is an electrical pulse of approximately ten to twenty microseconds with an amplitude of approximately five volts. This pulse may be provided to a power supply conditioning circuit to optimize the narrow pulse wave form for use in powering the electronics. Such a circuit may be configured to rectify and store the energy from the Wiegand pulse for use in circuitry performing other functions. This rectification could be done by component with a low voltage drop such as a schotky diode or other synchronous rectification using active devices such as a MOSFET. A reactive element or combination of elements such as inductors could be used to perform the filtering. Alternatively, capacitors appropriately selected to optimize the energy transfer from the Wiegand wire to the electronics could be utilized. A capacitor would store the resulting energy and maintain a voltage for the time required by the electronics. For those applications where a flow through the fluid meter would be intermittent, capacitors would be selected so as to maintain adequate voltage to operate the electronics for the periods of time between fluid flow. For extended periods of time, a high capacity capacitor such as one using double layered (superCap) technology could be used.

The output of the power supply conditioning circuit is a filtered and controlled voltage which is then supplied to the electronics that perform functions related to fluid measurement such as totalizing and data storage. Such electronics would incorporate suitable means for controlling powering up, operation, and powering down when being provided power by the conditioning circuit. For example, an initialization circuit could be provided to ensure proper operation of electronics upon the supply of power. The initialization circuit would sense the energy available from the power supply and allow operations of the electronics only if energy or power was adequate to complete the function to be performed by the electronics. A brownout detector could also be incorporated into the initialization circuit. This brownout detection circuit would be used to prevent operations from starting that could not be completed based upon the amount of power available. Such a circuit may be necessary for periodic operation where the power source, i.e. the flowing fluid, may not be continuous.

Data generated by the functions performed by the electronics could be stored in permanent memory. This would allow the electronics to resume operation at a known state upon being supplied power after a period of brownout. Such data storage could be performed with a ferro-electric RAM or ferro-electric LCD because these have been shown to operate in the time necessary to allow operation with a Wiegand wire pulse. A ferro-electric LCD may be preferable because of its advantage in allowing visible retention of data. More specifically, the user could view data stored by a ferro-electric LCD even if no energy was available to power the electronics.

Data supplied to the memory may be encoded to maximize data retention and endurance. For example, if the data is stored in RAM, incremental counts could be stored in Grey code to ensure that only one bit would change during any single increment of a counter or totalizer. Alternatively, additional memory locations could be used to store data such that memory location would only be updated on a shared basis, such as upon every third pulse. This would have the advantage of providing data redundancy in the case of accidental loss of data in a memory cell. Data validity in the memory can be provided by using an error detecting code such as CRC, checksum, or error correcting code such as Reed-Solomon.

Figure 2B:
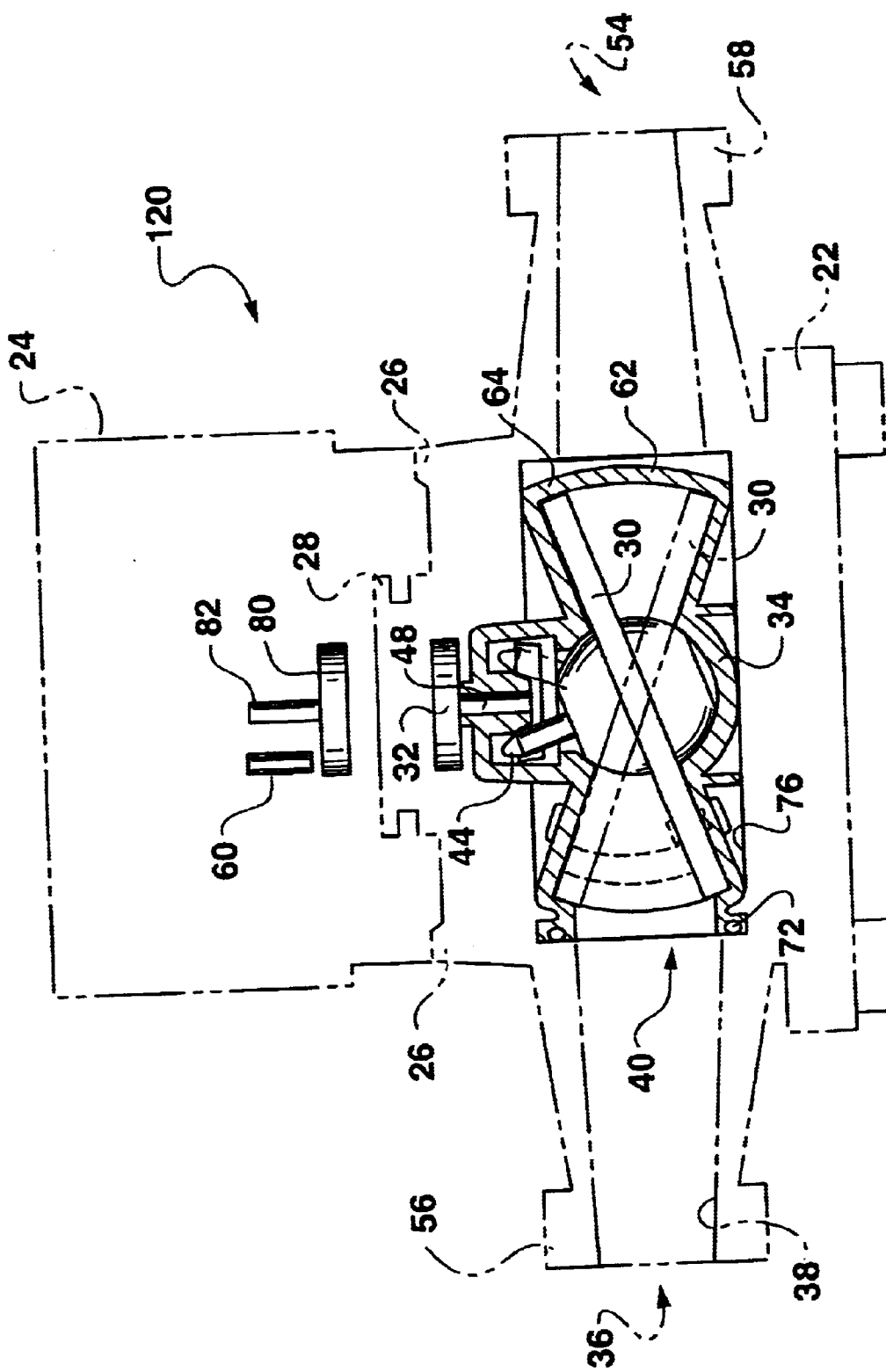
Figure 3:
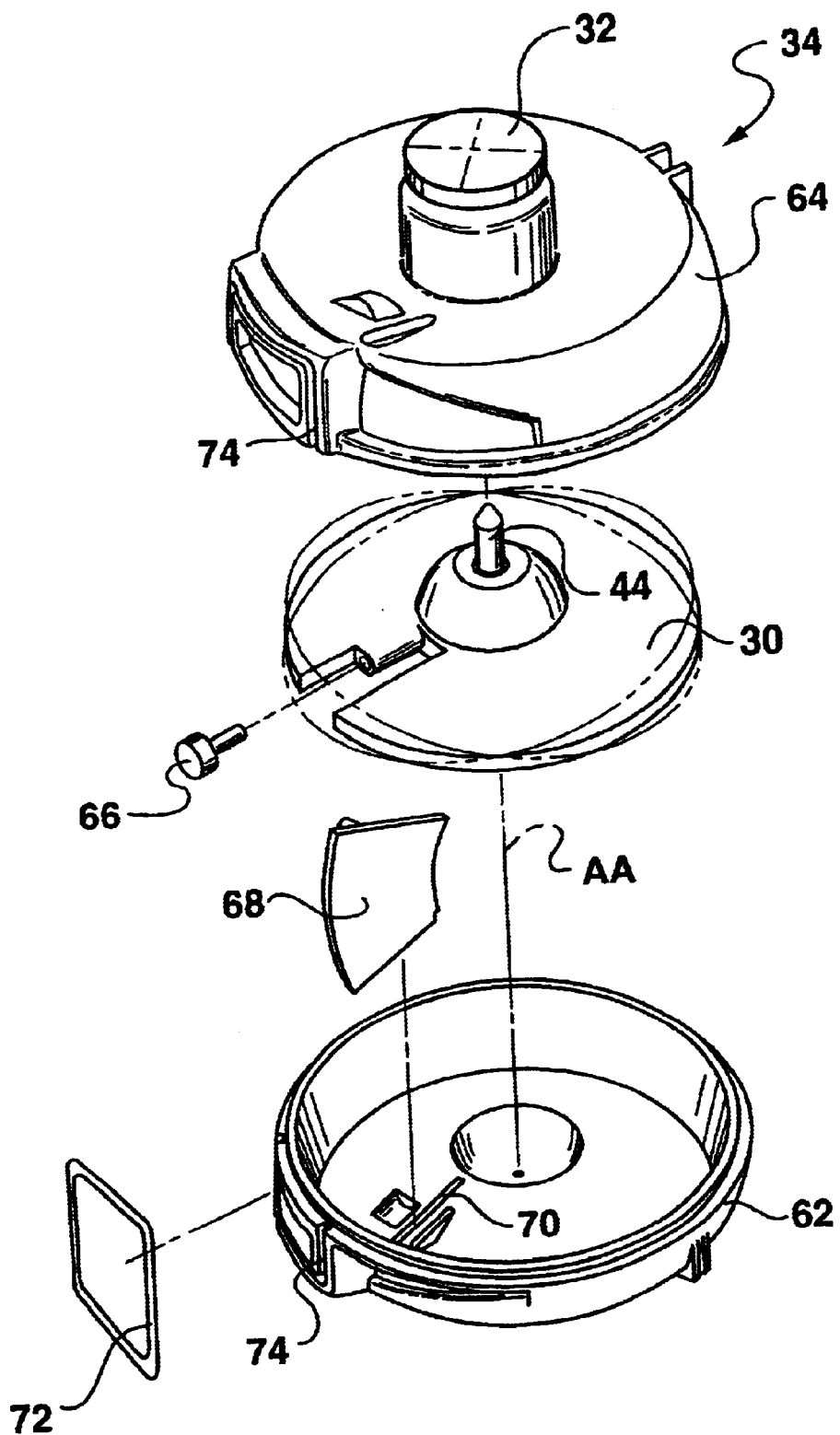
FIG. 3 is an exploded, perspective view depicting an exemplary configuration of the measuring element.
Figure 4:
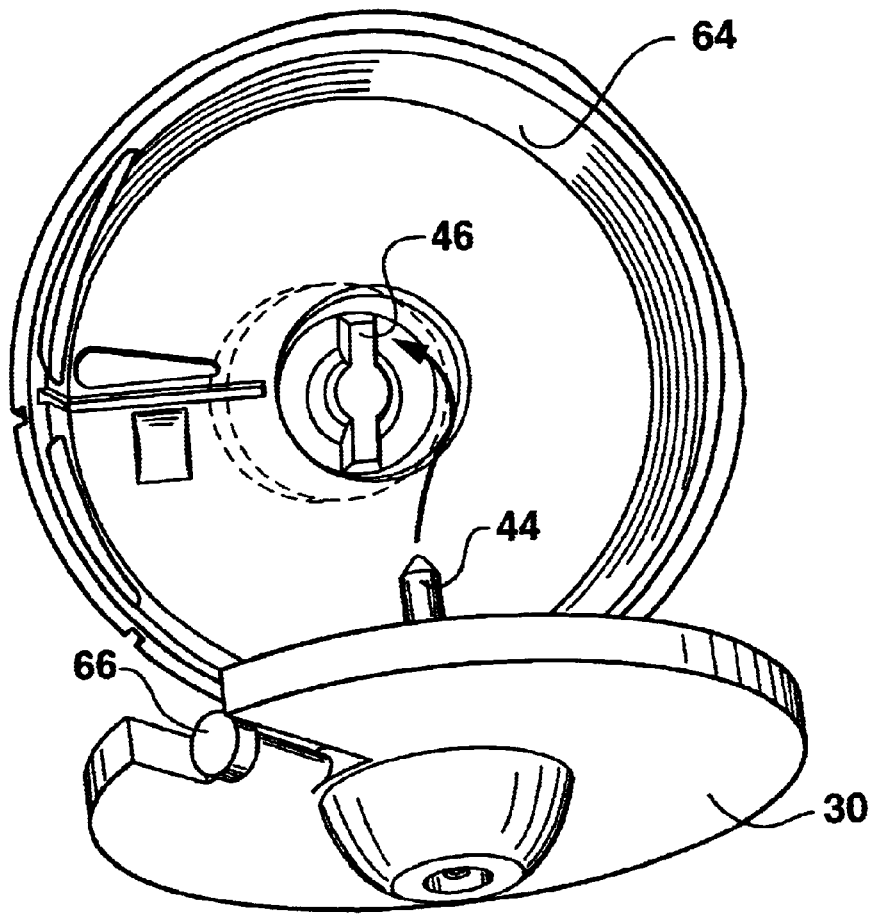
FIG. 4 is a perspective view of certain components depicted in FIG. 3.

As indicated above with regard to FIG. 2, a fluid flowing through the meter housing 22 causes the measuring element 30 to nutate about axis AA. As shown in FIG. 3, the cartridge 34 includes a base 62 and a cap 64. Enclosed within cartridge 34 is the measuring element 30 having the shaft 44. Attached to the measuring element 30 is an aligning wheel 66. As fluid flows through cartridge 34, measuring element 30 oscillates about axis AA, and the aligning wheel 66 rides up and down along a partition 68. Partition 68 is fixed in place in part by a recess 70 in the base 62. During the oscillations or nutations, shaft 44 rotates about axis AA causing meter magnet 32 to rotate. As shown in FIG. 4, shaft 44 acts upon the spindle 46, which in turn is in mechanical communication with the meter magnet 32. The entire assembly shown in FIG. 3 and FIG. 4, comprising the cartridge 34, is located within meter housing 22 as shown in FIG. 1 and FIG. 2. A seal 72 placed within a seat 74 formed in the base 62 and the cap 64 ensures a fluid seal between cartridge 34 and the internal wall 76 of meter housing 22.

Figure 5A:
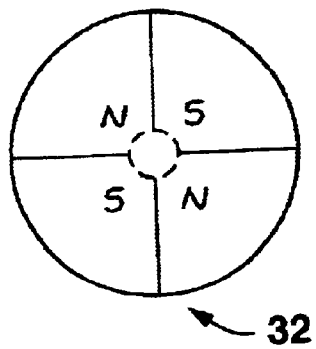
FIGS. 5A through 5C depict examples of meter magnets that may be utilized with embodiments of the present invention.
Figure 5B:
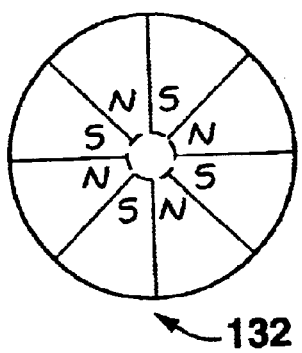
Figure 5C:
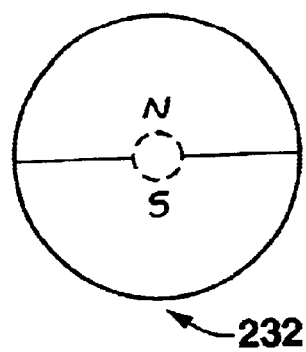

Referring to FIG. 5A thru FIG. 5C, meter magnet 32 may be constructed to have a plurality of poles. Increasing the numbers of poles within meter magnet 32 increases the resolution capability of fluid meter 20 by providing more changes in magnetic flux for a given revolution of measuring element 30. By way of example only, the meter magnet 32 shown in FIG. 5A would produce four signals during one revolution. Similarly, the meter magnet 132 shown in FIG. 5B would produce six pulses during one revolution. Finally, the magnet 232 shown in FIG. 5C would produce only two pulses during one revolution.

Figure 6:
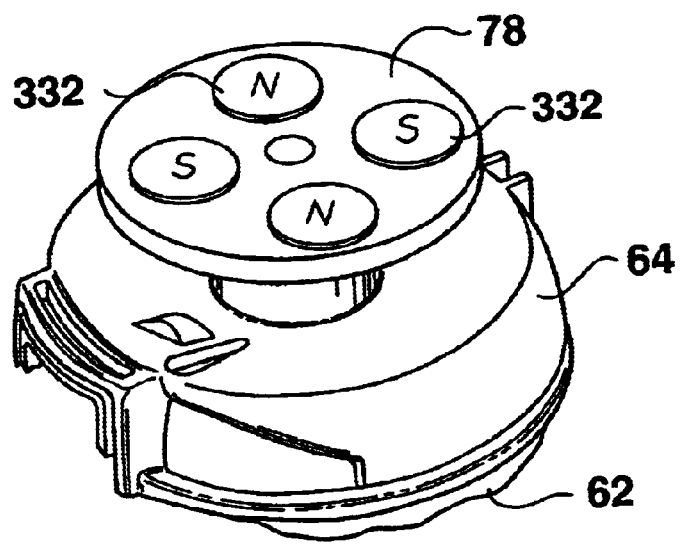
FIG. 6 is a perspective view of another magnet configuration which may be used in an embodiment of the present invention.
Figure 7:
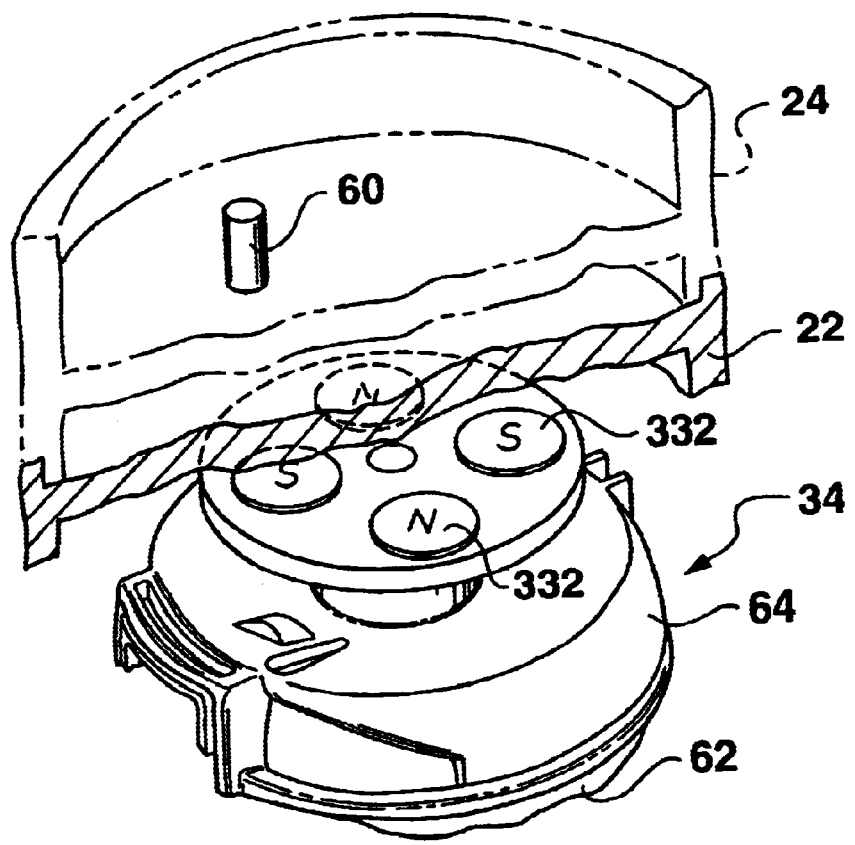
FIG. 7 is a perspective and partial cross-sectional view of an embodiment of the present invention.

FIG. 6 shows elements of another embodiment of the present invention in which a plurality of meter magnets 232 are attached to a rotating platform 78. (The repeat use of reference characters in this disclosure is intended to mean the same or analogous element). As a fluid acts upon measuring element 30, shaft 44 contacts spindle 46 and thereby causes the platform 78 to rotate. As shown in FIG. 7, the cartridge 34 is located within meter housing 22. Generating element 60 is located within the register housing 24. As platform 78 rotates due to the flow of fluid through cartridge 34, generating element 60 detects the resulting changes in magnetic field transferred through the walls of the meter housing 22 and register housing 24.

While FIG. 6 and FIG. 7 depict the use of four meter magnets 32, this embodiment of the present invention is not limited to this specific configuration. For example, numerous separate magnets 32 may be spaced about platform 78. Preferably, the magnets 32 should be oriented along the platform 78 so that during rotations the generating element 60 is subjected to changing fields of magnetic flux. Accordingly, the magnets 32 should be positioned along the platform 78 so that at least one change in polarity of the magnetic field, or change in magnetic flux, is detected by the generating element 60 as a result of the rotation of platform 68. For those embodiments where the generating element 60 is a Wiegand wire, it is conceivable that only one magnet 32 may be used. For example, a single magnet may be located along the platform 78 so that generating element 60 is subjected to a pulsing magnetic flux of a single polarity during the rotation of platform 78. More preferably, at least two magnets 32 are used and are oriented so that generating element 60 is subjected to a magnetic field of changing polarity as the platform 78 rotates.

Other embodiments of the present invention may be envisioned using the teaching disclosed herein. By way of example only, FIG. 2B shows another embodiment 120 of the present invention where a register magnet 80 is located within the register housing 24. The register magnet 80 is magnetically coupled to the meter magnet 32 due to the attractive forces of the magnets transmitted through the walls of meter housing 22 and register housing 24. During operation, fluid acts upon the measuring element 30 causing the shaft 44 to drive the spindle 46. In turn, the meter magnet 32 rotates so as to cause the register magnet 80 to rotate about a register magnet shaft 82. Generating element 60, located within register housing 24, may then be located in proximity to register magnet 72. As a result, during the rotation of register magnet 72, the generating element 60 is subjected to changing fields of magnetic flux. As shown is FIGS. 5A thru 5C, register magnet 72 may be constructed so as to subject generating element 60 to any number of changes in the field of magnetic flux during the rotation of register magnet 72.

In still another embodiment, cartridge 34 may include a rotating element that in inherently magnetic. For example, cartridge 34 may be a turbine or rotating disk constructed in whole or part of magnetic material. The generating element 60 may then be positioned so that it is subjected to the changes in magnetic flux caused by the rotation of such elements.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A batteryless fluid meter comprising
   a housing of predetermined volume through which a fluid flows;
   a magnet having at least two poles, said magnet rotating in a predetermined relationship with said fluid flow, thereby creating a rotating magnetic field;
   a weigand sensor positioned within said magnetic field, said weigand sensor outputting an electrical pulse with each change in polarity of said magnetic field;
   a conditioning circuit for receiving each said electrical pulse and using the energy from said pulses to power a circuit;
   a totalizer circuit powered solely by the energy from said pulses operative to count said pulses and store said pulse count;
   whereby said pulse count is representative of the volume of fluid flow through said housing.

2. The fluid meter of claim 1, wherein said conditioning circuit comprises a rectifier to utilize pulses of positive or negative polarity.

3. The fluid meter of claim 1, wherein said conditioning circuit comprises a capacitor to store energy from said pulses.

4. The fluid meter of claim 1 wherein said pulse count is stored in a memory.

5. The fluid meter of claim 4 wherein said memory is selected from the group consisting of: ferro-electric RAM and ferro-electric LCD memory.

6. The fluid meter of claim 1 further comprising a transmitter powered solely by the energy from said pulses.

7. The fluid meter of claim 6 further comprising a register attached to said housing and wherein said magnet, sensor, conditioning circuit, totalizer circuit, and transmitter are contained within said register.

8. A method of metering a fluid without utilizing a battery, said method comprising:
   directing a flow of fluid through a housing of predetermined volume;
   creating a magnetic field rotating in a predetermined relationship with said fluid flow;
   positioning a weigand sensor within said rotating magnetic field, whereby said weigand sensor outputs an electrical pulse each time said field changes polarity;
   receiving said pulses in a conditioning circuit and conditioning the energy from said pulses to be used as a power supply; and
   counting said pulses using a totalizer circuit powered solely from the energy of said pulses;
   whereby said pulse count is representative of the volume of fluid flow through said housing.

9. The method of claim 8, further comprising:
   storing said pulse count in a permanent memory.

10. The method of claim 9, further comprising:
    transmitting said pulse count to a receiver using a transmitter powered solely from the energy of said pulses.

* * * * *